US010833871B2

(12) United States Patent
Ranellucci et al.

(10) Patent No.: US 10,833,871 B2
(45) Date of Patent: *Nov. 10, 2020

(54) SYSTEM AND METHOD FOR DETERMINISTIC SIGNING OF A MESSAGE USING A MULTI-PARTY COMPUTATION (MPC) PROCESS

(71) Applicants: UNBOUND TECH LTD., Petah Tiqva (IL); BAR-ILAN UNIVERSITY, Ramat Gan (IL)

(72) Inventors: Samuel Ranellucci, Petah Tiqva (IL); Yehuda Lindell, Givat Shmuel (IL)

(73) Assignees: UNBOUND TECH LTD., Petah Tiqva (IL); BAR-ILAN UNIVERSITY, Ramat Gan (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/726,965

(22) Filed: Dec. 26, 2019

(65) Prior Publication Data

US 2020/0153640 A1 May 14, 2020

Related U.S. Application Data

(63) Continuation-in-part of application No. 16/183,868, filed on Nov. 8, 2018, now Pat. No. 10,630,471.

(51) Int. Cl.
*H04L 29/06* (2006.01)
*H04L 9/32* (2006.01)
*H04L 9/08* (2006.01)

(52) U.S. Cl.
CPC ............ *H04L 9/3252* (2013.01); *H04L 9/085* (2013.01); *H04L 9/088* (2013.01); *H04L 2209/46* (2013.01)

(58) Field of Classification Search
CPC .............................. H04L 9/3255; H04L 9/085
See application file for complete search history.

(56) References Cited

U.S. PATENT DOCUMENTS

| 9,489,522 | B1* | 11/2016 | El Defrawy | H04L 9/3218 |
| 2015/0213079 | A1* | 7/2015 | Shukla | G16B 50/00 707/687 |
| 2018/0034634 | A1* | 2/2018 | Benarroch Guenun | H04L 9/3073 |

FOREIGN PATENT DOCUMENTS

WO WO-2019170908 A1 * 9/2019 ........... H04L 9/3218

OTHER PUBLICATIONS

Ziegeldorf et al., "CoinParty: Secure Multi-Party Mixing of Bitcoins" Mar. 2-4, 2015, ACM 978-1-4503-3191-3/15/03 . . . $15.00. http://dx.doi.org/10.1145/2699026.2699100, , pp. 75-86 (Year: 2015).*

(Continued)

*Primary Examiner* — Harunur Rashid
(74) *Attorney, Agent, or Firm* — Alphapatent Associates, Ltd; Daniel J. Swirsky

(57) ABSTRACT

A method for signing a message, comprising performing a first Multi-Party Computation (MPC) process by multiple parties to compute a pseudorandom function, an input of the first MPC process comprises shares of a private signing key, each share is held by each party, the message is an input value to the pseudorandom function. The output of the first MPC process comprises multiple pairs of shares, each party holding a pair of shares, wherein each pair comprises a first value used for the MPC signing process and a second verifying value used for verifying correctness of the values provided by the multiple parties for the MPC signing process, and computing the signature on the message by performing an MPC signing protocol on the message, the (Continued)

MPC signing protocol receives as input shares of the output of the pseudorandom function from the multiple parties, and the message to be signed.

22 Claims, 5 Drawing Sheets

(56) References Cited

OTHER PUBLICATIONS

Andrychowicz et al "Multiparty Computation Protocols Based on Cryptocurrencies" May 2015, University of Warsaw, PhD dissertation. pp. 1-137 (Year: 2015) (Year: 2015).*
Peter et al., "Efficiently Outsourcing Multiparty Computation Under Multiple Keys" Dec. 2013, IEEE (Year: 2013).‡
Andrychowicz et al "Multiparty Computation Protocols Based on Cryptocurrencies" May 2015, University of Warsaw, PhD dissertation. pp. 1-137 (Year: 2015).‡

* cited by examiner
‡ imported from a related application

SYSTEM AND METHOD FOR DETERMINISTIC SIGNING OF A MESSAGE USING A MULTI-PARTY COMPUTATION (MPC) PROCESS

FIELD

The present disclosure generally relates to signing a message using a multi-party computation (MPC) process.

BACKGROUND

In crypto currencies, it is common practice to choose a single master key for the ECDSA digital signature and to derive multiple keys from that key. This has the advantage that it suffices to back up a single key, and yet many keys can be derived for the purpose of holding different accounts and having different addresses. This derivation takes for input a private derivation key (for example an ECDSA private key) and a public derivation string (which can be modified to obtain multiple different keys), and outputs a new key pair (private key and public key), sometimes an ECDSA key pair. An ECDSA key pair is of the form (Q,x) where Q is the public key, x is the private key, and Q=x·G where G is the generator (or base point) of the Elliptic curve being used. One particular standard for this is the BIP032/BIP044 derivation method.

In some cases, there is no single entity who holds the master key or any subsequently derived keys, and there is a set of parties who share the key, and they compute the ECDSA signature needed to transfer funds using secure multiparty computation (MPC); also known as threshold ECDSA signatures. In this case, the parties also use MPC in order to compute the derivation key, since the aim is that no key is ever held by any single party at any time. In this MPC, each party inputs its share of the key that is being used in the derivation, and the parties receive as output the shares of the new derivation key. This derivation can be achieved using standard known MPC techniques like garbled circuits for two parties or authenticated garbling of the BMR circuit for many parties. However, MPC does not prevent parties from changing their local inputs. In such a case, a malicious party can input an incorrect share of the derivation key and the result would be a derivation key that is a valid ECDSA key, but cannot be reconstructed from the master key. Thus, if the key shares are lost, then the backup master key cannot be used to recover the private key, resulting in the cryptocurrency that is protected by that key being permanently lost.

SUMMARY

In one embodiment of the invention a method is provided for securely applying derandomization to threshold signing schemes that guarantees that for each message there is at most one signature. A deterministic signature scheme is a signature scheme that associates to each message a unique signature. The signing process is enabled using a key-derivation function executed in a Multi-Party Computation (MPC) process, as elaborated below. The MPC process is performed between multiple computerized devices that exchange information, without revealing the secret used to generate the derivation key. The devices are defined below as parties in the MPC process.

In one embodiment of the invention a method is provided for verifying that this property holds even when one participant is corrupt and tries to cheat. Such verification may be enabled by the parties exchanging commitments and verifying that the commitments are correct.

In one embodiment of the invention a method is provided for signing a message, the method including performing a Multi-Party Computation (MPC) process by multiple parties, an input of the MPC process comprises shares of a private signing key, each share is held by a party of the multiple parties, and the message to be signed as an input value of a pseudorandom function; wherein an output of the MPC process comprises shares of the output of the pseudorandom function; performing an MPC signing protocol on the message, wherein the protocol receives as input shares of the output of the pseudorandom function.

In some cases, the shares of the private signing key are used as part of the signing process. In some cases, the method further comprising receiving a request to sign the message, and responsive to performing the MPC signing protocol on the message, sending the signature to the entity from which the request was sent. In some cases, the method further comprising a process of verifying correctness of the shares of the private signing key inputted by the multiple parties to the MPC process.

In some cases, the method further comprising the MPC process producing multiple pairs of shares, each party of the multiple parties holding a pair of shares and creating a commitment on an encryption of the pair of shares of the private signing key, opening the commitments and verifying that the values provided by the parties are correct.

In some cases, encrypting the pair of shares using an elliptic curve. In some cases, each pair of the multiple pairs comprises a first value used for the signing process and a second value used for verifying correctness of the values provided by the parties. In some cases, the values provided by the parties are used after verifying that the values provided by the parties are correct.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention in embodiments thereof discloses a system and method for managing derivation of a cryptographic key, also referred herein as key. The method is performed by multiple computerized nodes used to store shares of the key. The key may be used in the context of money transfer, for example a Blockchain-related transfer, when a cryptographic key is required to transfer the funds. The key may be used for any other purpose selected by a person skilled in the art. The method is configured to verify, with a very high probability, that the key shares inputted by all the nodes are correct and can be used to create a valid derivation key. The method is performed multiple times, for example in the range of 16-128, and each time the inputted shares to the derivation key are considered valid, reduces the probability that the node actual input is false.

Each of the multiple computerized nodes stores a share of the key used to derive a derivation key. The key shares may be generated using a multi-party computation (MPC) process. The nodes also store a set of instructions that are detailed below. Each node comprises a communication module configured to exchange messages with the multiple computerized nodes. The communication module may exchange signals via wireless or wired channels, for example via the internet, on cables, via a cellular network or any communication technique desired by a person skilled in the art. The nodes also comprise a memory unit configured to store a set of instructions to be executed by the nodes and to store the messages received from the multiple computerized nodes. The messages received from the multiple computerized nodes may be associated with an identifier of the specific node of the multiple computerized nodes that sent the message.

Figure 1:
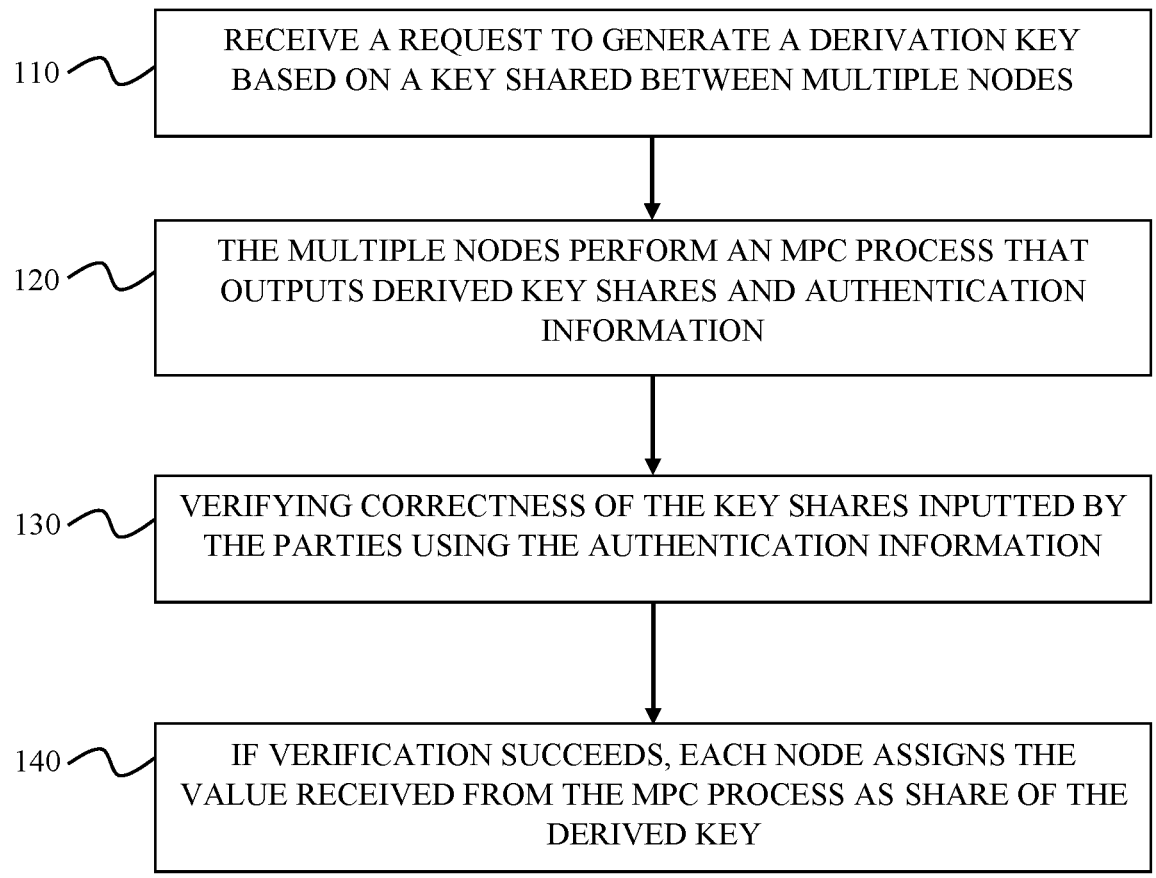
FIG. 1 discloses a method of deriving a key, according to exemplary embodiments of the invention.

FIG. 1 discloses a method of deriving a key, according to exemplary embodiments of the invention.

Step 110 discloses the multiple computerized nodes receive a request to generate a derivation key based on a key shared between multiple nodes. The request may be sent before transferring funds associated with the key. The nodes may be computers, servers, mobile electronic devices, cellular phones, and any electronic devices having a memory, communication module and memory for storing the key share and performing the instructions disclosed herein. Each node of the multiple computerized nodes performs the method below multiple times, as the logic output in each time is that there is 50% that the node provides a false value as the key share without being caught. Thus, performing the method 20 times and outputting that the value received from the nodes are correct implies that the likelihood of a false value received from the node is less than 1 to million. The number of times a value is requested from the node may be defined by a person skilled in the art.

Step 120 discloses the multiple nodes compute the derivation key using an MPC process. The MPC process is performed in a manner in which the entire key and the derivation key are never accessible to a single entity. The MPC process receives as input a derivation string which is public to all the nodes, and key shares provided by the nodes. The output of the MPC process is shares of the derivation key and authentication information. Each node receives a share of the derivation key. In typical embodiments of the invention, such a derivation key can be computed by computing the HMAC function with the key and public derivation string via MPC, so that the input and output key shares of a node are not revealed to any other node. The authentication information may be used to finalize the verifying correctness of the key shares. The MPC process is performed multiple times, as desired by the person skilled in the art, for example 20 times, 64 times, 144 times and the like. In some cases, in each time the output of the MPC process may be the authentication information or the derivation key shares. At the end of the MPC process, the nodes receive both the authentication information and the derivation key shares in a very high probability.

Step 130 discloses verifying correctness of the key shares inputted by the nodes for the key derivation process. The correctness of the key shares is performed by exchanging messages between the multiple computerized nodes, as detailed below. At least some of the messages contain outputs of cryptographic operations. In the end of the verifying correctness phase, the nodes can verify in a very high probability whether or not the other node inputted the correct share for the key derivation process.

Step 140 discloses the nodes assigning the values received in step 120 as shares of the derivation key, if the verification performed in step 130 succeeds.

Figure 2:
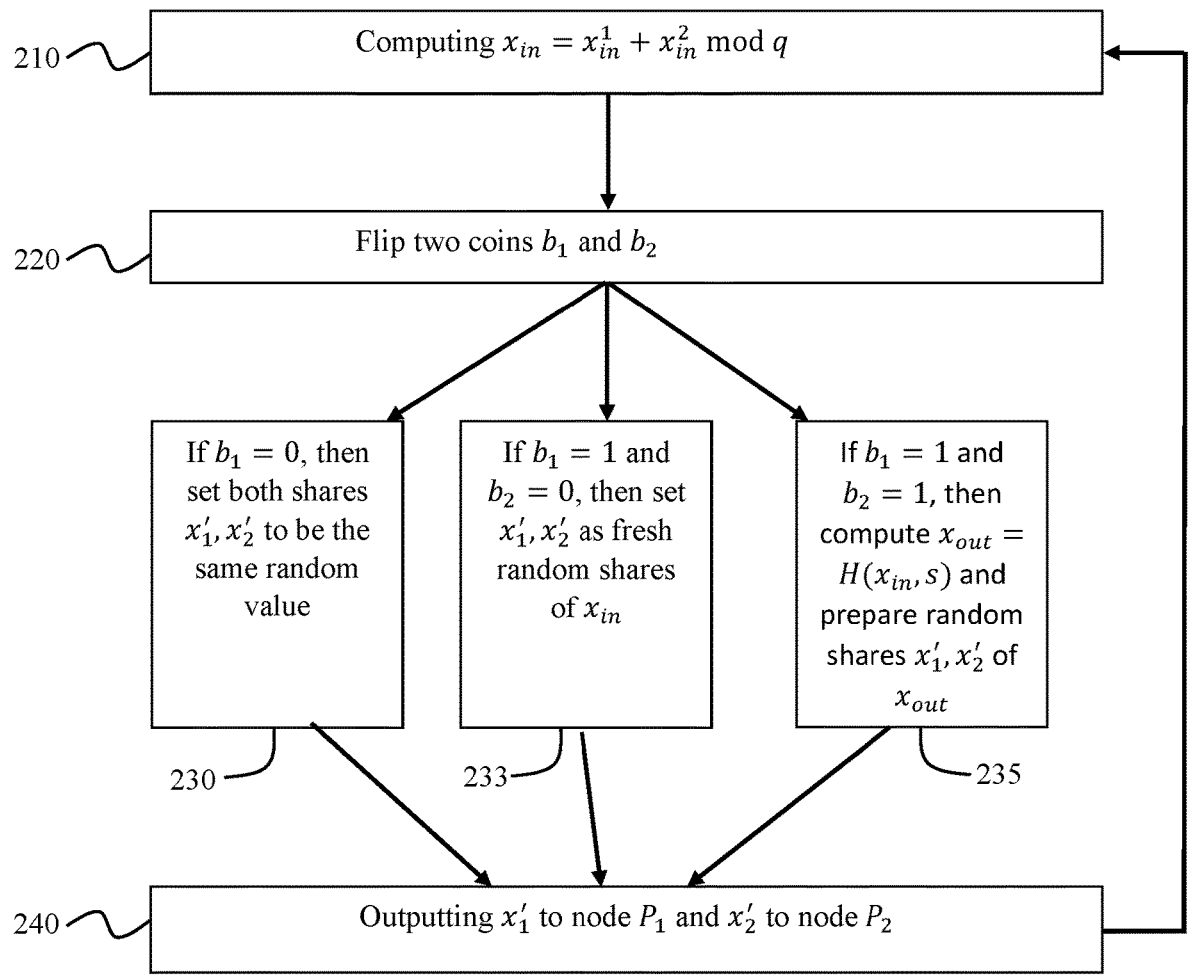
FIG. 2 discloses a method for enforcing correctness of key shares during a key derivation process, according to exemplary embodiments of the invention; and, FIG. 3 discloses a method for computing and encrypting the output of the selected function to verify correctness of the key shares, according to exemplary embodiments of the invention.

FIG. 2 discloses a method for performing an MPC process configured to output shares of the derivation key and authentication information, according to exemplary embodiments of the invention. The MPC process is performed multiple times, each time the MPC process outputs either the shares of the derivation key or authentication information. The number of multiple times may be predefined, or the MPC process may terminate in response to a predefined event, for example after all the optional options elaborated in steps 230, 233 and 235. Thus, for example, in the first and second time, the coins indicate that the key derivation option is selected. In occurrences number 3, 7 and 9-11, the shares are created according to step 233 and in occurrences number 4-6, 8 and 12, the shares are created according to step 235.

Step 210 discloses computing $x_{in} = x_{in}^1 + x_{in}^2 \mod q$. It should be noted that none of the nodes that perform the MPC process hold or have access to both $x_{in}^1$ and $x_{in}^2$ during any of the processes described in the invention. $x_{in}^1$ is the share stored in node 1 and $x_{in}^2$ is the share stored in node 2. $x_{in}$ denotes the random string used as part of the signing process.

Step 220 discloses Flip two coins $b_1$ and $b_2$. The two coins represent 4 options having substantially the same probability to take place. As the next steps are performed multiple times, the MPC process performed by the nodes requires that all 4 options are randomly selected in a very high likelihood, for example a probability of at least 99.99%. Flipping the coins may be performed using a Bernouli process implemented on a computer software running on an MPC process between the nodes. The outcome of the coins is not revealed to any of the nodes. For simplicity, the coins may have a value of "0" or "1". The flip coin is a representation of a random selection of one option from multiple options disclosed in steps 230, 233 and 235. The options may be selected in equal or unequal probabilities.

After flipping the coins, the MPC process sets two values, each value is configured to be outputted to another node. In case the first coin has a value "0", as disclosed in step 230, the MPC process sets both shares $x'_1$, $x'_2$ to be the same random value. In case the first coin has a value "1" and the second coin has a value "0", as disclosed in step 233, the MPC process sets both shares $x'_1$, $x'_2$ to be random shares of $x_{in}$ (that is, $x'_1 + x'_2 = x_{in} \mod q$). In case the first coin has a value "1" and the second coin has a value "1", as disclosed in step 235, the MPC process computes $x_{out}=H(x_{in}, s)$ and prepare random shares $x'_1$, $x'_2$ of $x_{out}$. It should be noted that the mathematical computations disclosed in steps 233 and 235 are exemplary only, and represent any selection of random values that can be used to verify the correctness in the method described in FIG. 3. The nodes are not aware at any stage of the option selected by the coin flip.

Then, in step 240, the share $x'_1$ is outputted to node $P_1$ and the share $x'_2$ is outputted to node $P_2$. Again, also when outputting the shares $x'_1$ and $x'_2$, none of the nodes has access to the shares. In some cases, the process is repeated after step 240, as shown in FIG. 2. In some other cases, coin flip is performed multiple times, for example 64 times, each time is assigned an identifier, then, the selected option is performed, according to the value of the identifier. For example, value "00" indicates that both coin flips were assigned "0". Then, all the 64 outputs are outputted to each node using the MPC process, and each node has 64 occurrences of outputs, for example, 20 key derivation shares, 20 random shares and 24 random additive shares.

Figure 3:
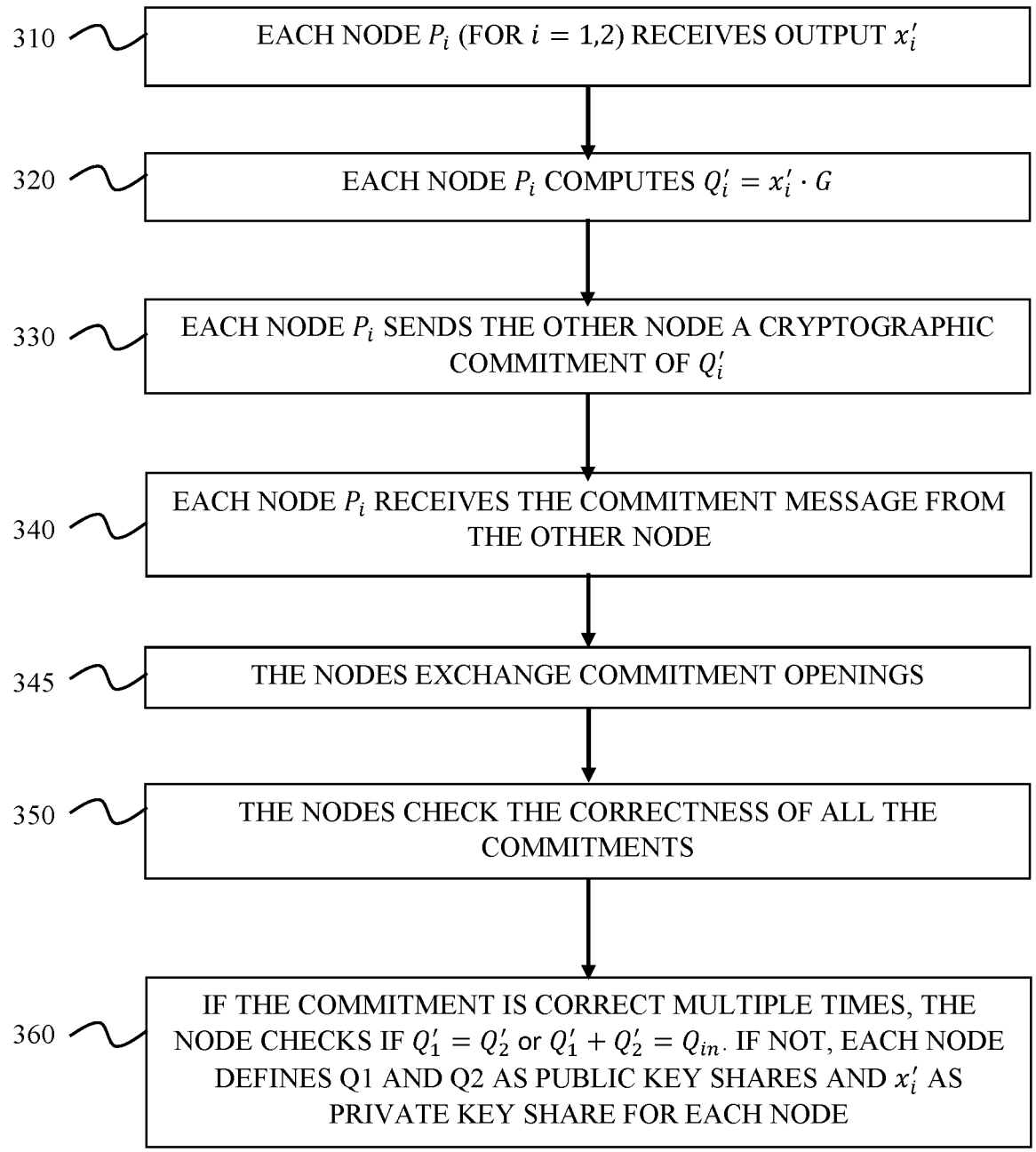

FIG. 3 discloses a method for computing and encrypting the output of the selected function to verify correctness of the key shares, according to exemplary embodiments of the invention.

In step 310, each node $P_i$ (for i=1, 2) receives function output $x'_i$. For example, node P1 receives X1 and P2 receives X2.

In step 320, each node $P_i$ computes $Q'_i=x'_i \cdot G$. G is the generator (or base point) of the Elliptic curve being used. It should be noted that $x'_i$ cannot be extracted from $Q'_i$, as G is an irreversible function.

In step 330, each node $P_i$ sends the other node a cryptographic commitment of $Q'_i$. The commitment is defined as a value that bounds the node to the value but does not reveal it. The commitment may be computed, for example, by choosing a random $r_i$ of length 128 bits and computing $c_i=SHA256(Q'_i, r_i)$. Then, the nodes exchange the value $c_i$.

In step 340, each node $P_i$ receives the cryptographic commitment from the other node. exchange of the commitments, commitment openings and additional messages between the nodes may be performed via a wired or wireless channel. In some exemplary cases, the nodes are different and distinct entities located nearby, even in the same building or server farm/cluster.

In step 345, the nodes exchange commitment openings. The commitment openings may be the commitment message before the hash function is applied thereto. For example, the commitment opening is $(Q'_i, r_i)$ while the commitment message is $c_i=SHA256(Q'_i, r_i)$.

In step 345, the nodes check the result of the commitments. Checking may be performed by applying the hash function on the commitment opening and comparing the output of the hash function to the commitment message.

In step 360, if the commitment is correct multiple times and if $Q'_1=Q'_2$ or $Q'_1+Q'_2=Q_{in}$, and the multiple Q1 and Q2 values received in each node are the same in all iterations, define $Q_1$ and $Q_2$ as public key shares, $x'_i$ as private key share for each node, and $Q=Q_1+Q_2$ as the derived public key. The method may define one or more functions that can be verifiable by the nodes without revealing the outputs X1 and X2. As noted above, one optional verifiable function outputs two random and equal values. Thus, the nodes can check whether Q1 equals Q2 and thus X1 equals X2. Otherwise, the nodes conclude that the selected function is the function that computes the derivation key. In such a case, the outputted values X1 and X2 are stored in the nodes as the shares of the derivation key. Another verifiable function is outputting two additive shares of Xin.

In case the selected function outputs equal random values, no node can modify the $Q'_i$ value that it sends in the commitment, or the node will be detected cheating, as all the nodes should have the same value, and this will be different. The malicious node may send a different value and hope that this will fall into the case another verifiable function selected or being the same value as stored in other executions, but since $Q'_j$ is just a random value, the chance of it falling into another case is extremely small.

Assume that a node inputs an incorrect share into the computation and the selected function outputs two values such that X1+X2 equals Xin mod q. In this case, the malicious node needs to make the result equal $Q_{in}$. This requires it changing its $Q'_j$ value since the input share was incorrect and $Q_{in}$ is publicly known. However, by what we have just explained, it cannot change $Q'_j$ if b_1=0 or it will be detected. Thus, such a strategy is doomed to fail and have the cheating be detected.

Finally, assume that both nodes input correct shares, but an attacker wishes to make the resulting key be incorrect. In order to do so, the attacker has to change the $Q'_j$ value it received. Again, this strategy is doomed to fail as the attacker must input its correct share and cannot change its output; else, it will be detected with a very high probability.

Figure 4:
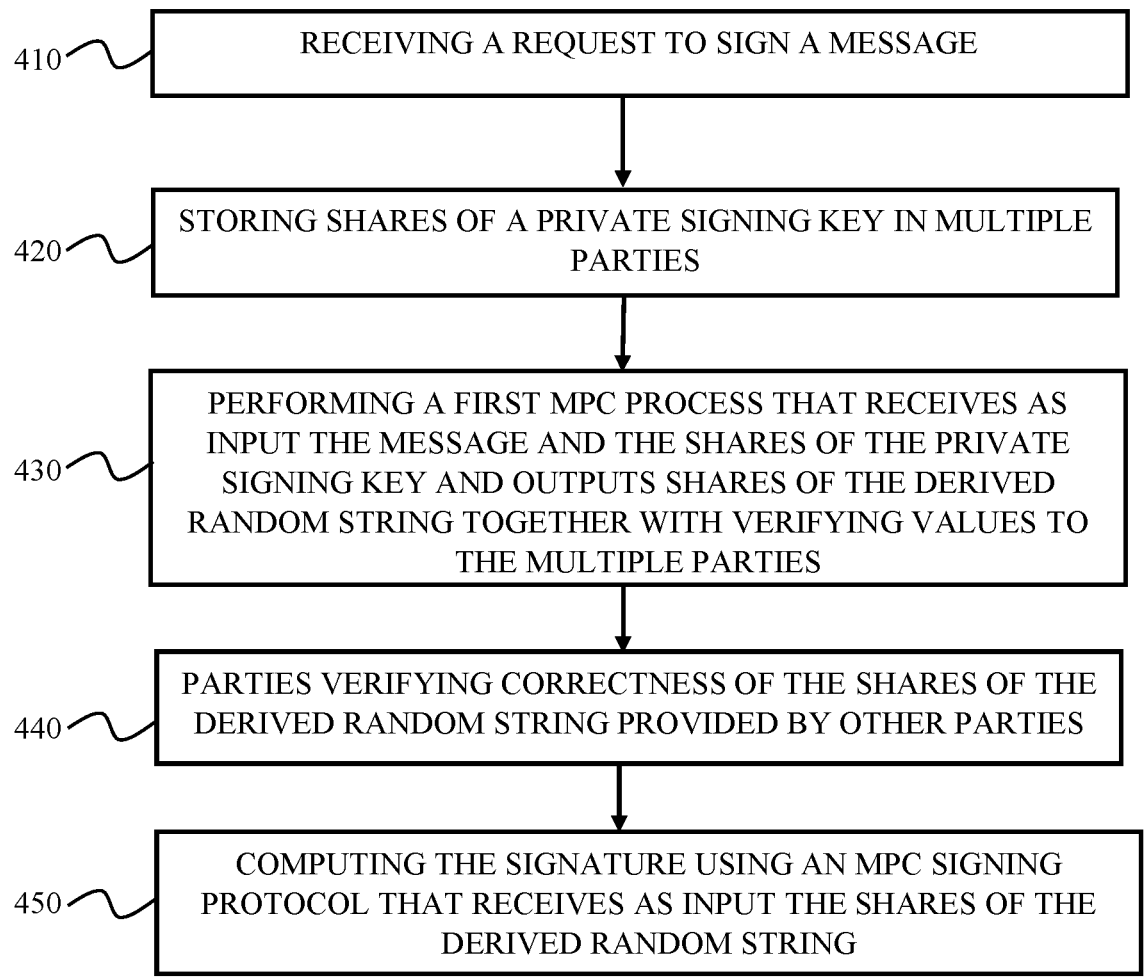
FIG. 4 discloses a method for method for signing a message, according to exemplary embodiments of the invention.

FIG. 4 discloses a method for method for signing a message, according to exemplary embodiments of the invention. The signing process enables deterministic signing, in which each message is associated with a unique signature, and this is cryptographically enforced. The method utilizes a Key-derivation function (KDF), which receives as input a key and a value, and outputs a pseudorandom value (or a key and multiple values, and outputs multiple pseudorandom values). The KDF function may also be known as a pseudorandom function.

Step 410 discloses receiving a request to sign a message. The request may be received from a third party entity, such as a web server, laptop, cellular phone and the like. The request may be received via an email message, or a request automatically sent to a communication unit of a computer managing the signing process of the message.

Step 420 discloses storing shares of a private signing key in multiple parties. The shares are stored in memory modules of the server, for example in a specific memory address in the memory of the parties. The shares are stored in a manner that one party lacks access to the shares stored in the other parties during the entire signing process.

Step 430 discloses performing a first Multi-Party Computation (MPC) process to compute a first function that receives as input the message and the shares of the private signing key, and outputs shares of a derived random string together with verifying values to the multiple parties. The verifying values are outputted in order to prevent corruption of values in the signing process, thereby enforcing the parties to use the correct derived random string.

Thus, the output of the first MPC process is a pair of values provided to each of the multiple parties—a verifying value and a share of the derived random string. Both values are provided by the parties during a verifying process disclosed below.

Step 440 discloses the parties verifying correctness of the values provided by other parties. The correctness may be verified by performing a commitment process as detailed in FIG. 5, in which each party generates a commitment and sends the commitment to the other parties.

During the verifying process, each party of the multiple parties provides one of the values based on a random mechanism, such as a computerized coin toss. This random mechanism is executed multiple times, for example in the range of 20-50 times, to verify that at least once the share of the pseudo random string is provided by the multiple parties and at least once the verifying value is provided by the multiple parties. This way, in case the party wishes to provide a corrupted value, the verifying value is revealed, and the signing process stops. For example, in case the random value is "0", the key derivation is generated and in case the random value is "1", the values provided by the parties are checked, for example in a manner disclosed in FIG. 2. This way, if one of the parties provides an incorrect value, the corrupted party is revealed, and the corrupted pseudo random string is not used.

Step 450 discloses computing the signature by performing an MPC signing process that receives as input shares of the derived random string resulting from the first MPC process of step 430. The MPC signing process receives as input shares of the derived random string from the multiple parties. The shares of the derived random string used during the signing process are new as prior art solutions use independent random values, chosen locally by each party.

Figure 5:
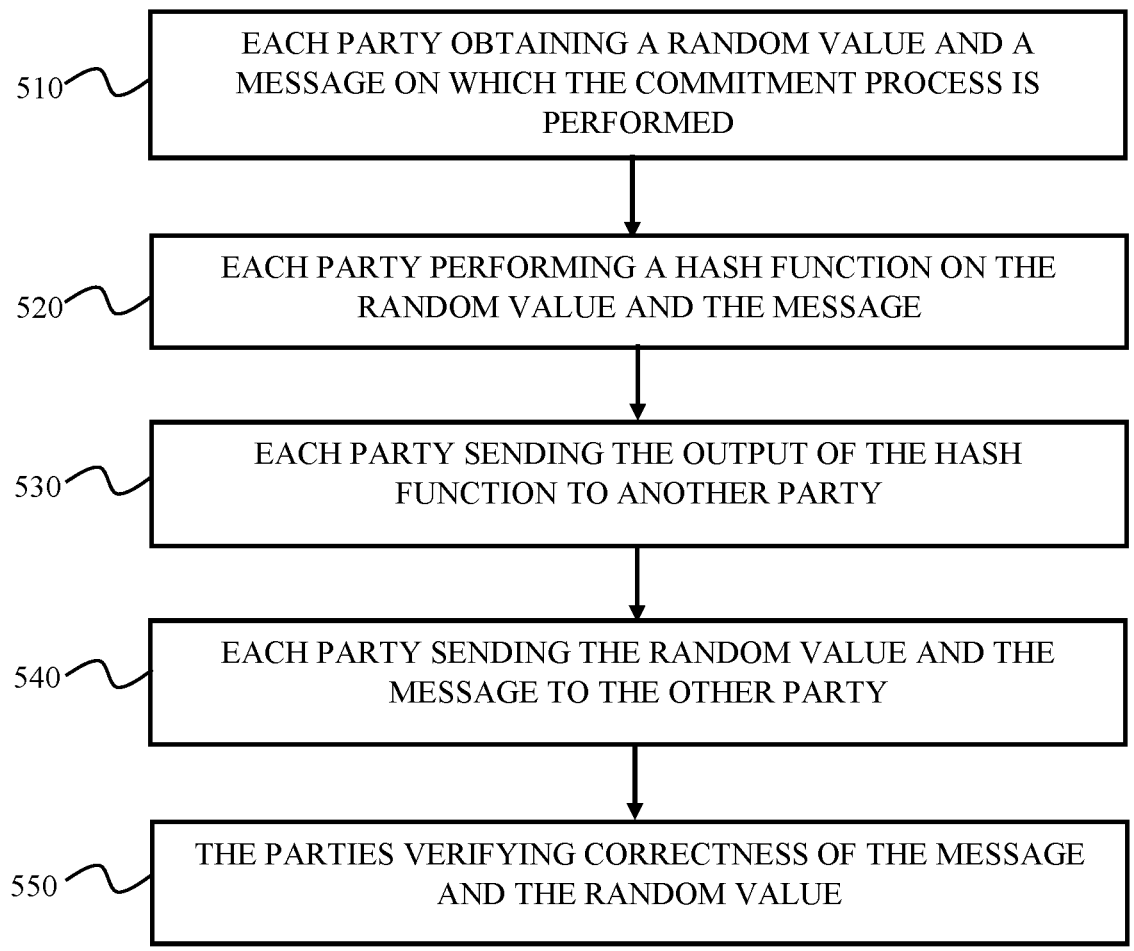
FIG. 5 discloses a method for performing a commitment process on a separate pair of shares, according to exemplary embodiments of the invention.

FIG. 5 discloses a method for performing a commitment process on a separate pair of shares, according to exemplary embodiments of the invention. A commitment may be defined as a commitment value that bounds the party to a value but does not reveal the value. A commitment is used in two steps—first a party binds itself to the value and in the second step the party reveals the value that he bounded itself to and proves that this was indeed the value that he bounded itself too. The commitment value may be an output of a hash function of the value.

Step 510 discloses each party obtaining a random value and a message on which the commitment process is performed. The random value and the message are stored in the memory of each party and cannot be accessed by other parties.

Step 520 discloses each party performing a hash function on the random value and the message. Step 530 discloses each party sending the output of the hash function to another party. Such transmission may be performed via the internet, a cable or any other technique. The parties may have communication details of the other parties in the memory module of each party.

Step 540 discloses each party sending the random value and the message to the other party.

Step 550 discloses the parties verifying correctness of the message and the random value. Such correctness may be performed by the parties receiving the message and the random value performing a hash function on the received message and random value and verify that the output of the hash function is the value received from the other parties in step 530.

While the disclosure has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the disclosed invention not be limited to the particular embodiment disclosed as the best mode contemplated for carrying out this invention, but only by the claims that follow.

What is claimed is:

1. A method for signing a message, comprising:
receiving a request to sign the message;
performing a first Multi-Party Computation (MPC) process by multiple parties to compute a pseudorandom function, an input of the first MPC process comprises shares of a private signing key, each share is held by a party of the multiple parties,
wherein the message to be signed is an input value to the pseudorandom function,
wherein an output of the first MPC process to compute the pseudorandom function comprises producing multiple pairs of shares of the output of the pseudorandom function, each party of the multiple parties holding a pair of shares,
wherein each pair of the multiple pairs comprises a first value used for the MPC signing process and a second verifying value used for verifying correctness of the values provided by the multiple parties for the MPC signing process, and
wherein each party of the multiple parties provides one of the values in the pair of shares based on a random mechanism executed multiple times, to verify that at least once the value used for the MPC signing process is provided by the multiple parties and at least once the second verifying value is provided by the multiple parties;
computing the signature on the message by performing an MPC signing protocol on the message, wherein the MPC signing protocol receives as input shares of the output of the pseudorandom function from the multiple parties for the signature randomness, and the message to be signed; and
sending the signature to the entity from which the request was sent after performing the MPC signing protocol on the message.

2. The method of claim 1, wherein the key to the pseudorandom function is the private signing key.

3. The method of claim 1, wherein the shares of the private signing key are used as part of the signing process.

4. The method of claim 1, wherein encrypting the pair of shares using an elliptic curve.

5. The method of claim 1, further comprising verifying correctness of the shares of the private signing key inputted by the multiple parties to the MPC signing process using the verifying values.

6. The method of claim 5, wherein verifying correctness of the shares of the private signing key comprises performing an arithmetic manipulation on the verifying values.

7. The method of claim 5, wherein the values provided by the multiple parties to the MPC signing process are used after verifying correctness of the shares of the private signing key.

8. The method of claim 1, further comprising:
the multiple parties creating a commitment on an encryption of the pair of shares of the private signing key,
at least one party of the multiple parties sending the commitment to another party of the multiple parties; and
the parties receiving the commitment opening the commitments and verifying that the values provided by the multiple parties to the MPC signing process are correct.

9. The method of claim 1, wherein the pseudorandom function is a key-derivation function.

10. A method for signing a message, comprising:
performing a first Multi-Party Computation (MPC) process by multiple parties to compute a pseudorandom function, an input of the first MPC process comprises shares of a private signing key, each share is held by a party of the multiple parties, wherein the message to be signed is an input value to the pseudorandom function,
wherein an output of the first MPC process to compute the pseudorandom function comprises producing multiple pairs of shares of the output of the pseudorandom function, each party of the multiple parties holding a pair of shares, and
wherein each pair of the multiple pairs comprises a first value used for the MPC signing process and a second verifying value used for verifying correctness of the values provided by the multiple parties for the MPC signing process;
verifying correctness of the shares of the private signing key inputted by the multiple parties to the MPC signing process using the verifying values,
wherein verifying correctness of the shares of the private signing key comprises performing an arithmetic manipulation on the verifying values, and
wherein each party of the multiple parties provides one of the values in the pair of shares based on a random mechanism executed multiple times, to verify that at least once the value used for the MPC signing process is provided by the multiple parties and at least once the second verifying value is provided by the multiple parties; and
computing the signature on the message by performing an MPC signing protocol on the message, wherein the MPC signing protocol receives as input shares of the output of the pseudorandom function from the multiple parties for the signature randomness, and the message to be signed.

11. The method of claim 10, wherein the key to the pseudorandom function is the private signing key.

12. The method of claim 10, wherein the shares of the private signing key are used as part of the signing process.

13. The method of claim 10, further comprising receiving a request to sign the message.

14. The method of claim 13, further comprising sending the signature to the entity from which the request was sent after performing the MPC signing protocol on the message.

15. The method of claim 10, wherein encrypting the pair of shares using an elliptic curve.

16. The method of claim 10, further comprising:
the multiple parties creating a commitment on an encryption of the pair of shares of the private signing key;
at least one party of the multiple parties sending the commitment to another party of the multiple parties; and
the parties receiving the commitment opening the commitments and verifying that the values provided by the multiple parties to the MPC signing process are correct.

17. A method for signing a message, comprising:
performing a first Multi-Party Computation (MPC) process by multiple parties to compute a pseudorandom function, an input of the first MPC process comprises shares of a private signing key, each share is held by a party of the multiple parties,
wherein the message to be signed is an input value to the pseudorandom function,
wherein an output of the first MPC process to compute the pseudorandom function comprises producing multiple pairs of shares of the output of the pseudorandom function, each party of the multiple parties holding a pair of shares, and
wherein each pair of the multiple pairs comprises a first value used for the MPC signing process and a second verifying value used for verifying correctness of the values provided by the multiple parties for the MPC signing process;
verifying correctness of the shares of the private signing key inputted by the multiple parties to the MPC signing process using the verifying values, wherein the values provided by the multiple parties to the MPC signing process are used after verifying correctness of the shares of the private signing key, wherein each party of the multiple parties provides one of the values in the pair of shares based on a random mechanism executed multiple times, to verify that at least once the value used for the MPC signing process is provided by the multiple parties and at least once the second verifying value is provided by the multiple parties; and
computing the signature on the message by performing an MPC signing protocol on the message, wherein the MPC signing protocol receives as input shares of the output of the pseudorandom function from the multiple parties for the signature randomness, and the message to be signed.

18. The method of claim 17, wherein the shares of the private signing key are used as part of the signing process.

19. The method of claim 17, further comprising receiving a request to sign the message.

20. The method of claim 19, further comprising sending the signature to the entity from which the request was sent after performing the MPC signing protocol on the message.

21. The method of claim 17, further comprising encrypting the pair of shares using an elliptic curve.

22. The method of claim 17, further comprising:
the multiple parties creating a commitment on an encryption of the pair of shares of the private signing key;
at least one party of the multiple parties sending the commitment to another party of the multiple parties; and
the parties receiving the commitment opening the commitments and verifying that the values provided by the multiple parties to the MPC signing process are correct.

* * * * *